United States Patent [19]

Hillegass et al.

[11] 3,903,043

[45] Sept. 2, 1975

[54] CARBON BLACK LOADED POLYURETHANE HAVING A DIENE BACKBONE

[75] Inventors: Donald V. Hillegass, Alliance; Leland E. Beyersdorff, North Canton, both of Ohio

[73] Assignee: The Goodyear Tire & Rubber Company, Akron, Ohio

[22] Filed: Sept. 30, 1974

[21] Appl. No.: 510,533

[52] U.S. Cl............................ 260/42.47; 260/37 N
[51] Int. Cl. ............................................. C08f 45/08
[58] Field of Search...................... 260/37 N, 42.47

[56] References Cited
UNITED STATES PATENTS 3,338,861  8/1967  Mastin et al................. 260/37 N X
3,714,110  1/1973  Verdol et al................. 260/37 N X

*Primary Examiner*—Lewis T. Jacobs
*Attorney, Agent, or Firm*—F. W. Brunner; J. D. Wolfe

[57] ABSTRACT

This invention provides a method of making a carbon black loaded polyurethane having a diene backbone that passes the Goodrich Flex test and has a crescent tear of at least 200 pounds per inch. This polyurethane is obtained by mixing a carbon black into the hydroxyl terminated diene polymer or copolymer containing glycol and then reacting with an isocyanate at an Rv ratio of 1.25±0.1 and at a hydroxyl polymer to glycol ratio in the range of 2.5 to 1.0.

6 Claims, No Drawings

CARBON BLACK LOADED POLYURETHANE HAVING A DIENE BACKBONE

This invention relates to carbon black reinforced polyurethanes having a diene backbone capable of passing the Goodrich flex test and having a crescent tear of at least 200 pounds per inch.

In general, carbon black loading of polyurethanes does not improve the physical properties. Although it is possible to produce carbon black loaded polyurethanes having a diene backbone, these carbon black loaded polyurethanes have poor crescent tear.

It is an object of this invention to provide a method for producing carbon black reinforced polyurethanes having a diene backbone capable of passing the Goodrich flex test and having a crescent tear of at least 200 pounds per inch.

This object and other advantages can be obtained by mixing the organic polyisocyanate and a polymeric polyol having a diene backbone and glycol by the one-step method and reacting to give a cured polyurethane. The carbon black preferably is intimately incorporated in the polymeric polyol to build viscosity of the mixture and thus subject the carbon black to high shearing action such as is obtained on a three roll paint mill.

The equivalent ratio (Rv) of the reactants are chosen to give an isocyanate to total hydroxyl ratios of about 1.25 ± 0.1 and the glycol to polymeric polyol ratio are chosen to be in an equivalent ratio varying from 2.5 to 1.0 with the preferred ratio being 1.5 to 2.0.

Suitable polymeric polyols having a diene backbone are those formed by hydroxyl termination of the homo and the copolymers of olefins such as diolefin-alpha olefin copolymers. Representative examples of the diolefins normally used to make the polymeric polyols having a diene backbone are those of 4 to 10 carbon atoms and illustrated by butadiene, isoprene-1,3-pentadiene, 2,4-dimethyl-butadiene and hexadiene. Representative examples of alpha-olefins normally used to make polymeric polyols having a diene backbone containing co-mers of the alpha-olefin is illustrated by those containing 2 to 20 carbon atoms such such as ethylene, propylene, hexylene, acrylonitrile and styrene. Generally, these polymeric polyols containing a diene backbone have a molecular weight of about 1600 to 4500 and preferably 2000 to 3600 and a hydroxyl equivalent value of 800 to 2200. Some polymeric polyols readily available commercially are those available under the "ARCO" tradename and generically designated as hydroxy terminated polybutadiene, hydroxy terminated polybutadiene-styrene polyol, and the hydroxy terminated polybutadiene-acrylonitrile polyol. The hydroxy terminated copolymers usually vary from 60–80 percent diene and 40–20 percent alpha-olefin.

The organic polyisocyanates useful in this invention are toluene diisocyanate, methane di(phenyl isocyanate) sometimes called MDI, and the polymeric MDI's. The "Mondur" systems from Mobay Chemical Company (MONDUR MRS) and the "Isonates" from the Upjohn Company (ISONATE 143L) are typical examples of these polymeric isocyanate systems. Also, the aliphatic and cycloaliphatic polyisocyanates can be used and a preferred one is the commercial methane bis(cyclohexyl isocyanate).

As indicated heretofore, it is preferred to intimately incorporate the carbon black, for instance, high abrasion furnace black (HAF), into the polymeric polyol having the diene backbone, for instance, hydroxyl terminated polybutadiene styrene of about 1530 equivalent weight in a high shear mixer under conditions to exclude air entrappment, viz. a vacuum, before the glycol is added and mixed therein to give a carbon black masterbatch. The organic polyisocyanate and preferably the catalyst are added to the masterbatch and stirred approximately 1 to 2 minutes before being charged into a mold. The polyurethane is cured at elevated temperature, preferably at 300°F. for 60 minutes. The temperature and time of cure are a function of the amount of catalyst used and may vary accordingly. Likewise, it is desirable in some instances to postcure the polyurethane for 8 to 16 hours at 130° to 200°F.

The nature of this invention and its advantages can be more readily appreciated from the following illustrative and representative examples where all parts and percentages are by weight unless otherwise indicated.

EXAMPLE I

A 100 parts of a hydroxyl terminated polybutadiene-styrene resin of approximately 3520 molecular weight to which 35 parts of HAF Black was added and mixed on a high shear mixer to give a homogeneous mixture. One and one-half equivalents of propylene glycol for each equivalent of the resin was added and mixed into the homogeneous mixture. Then sufficient toluene diisocyanate (80/20–2,4/2,6 isomeric mixture) was added and mixed for one minute to give the Rv ratios shown in Table 1. Then 0.0002 parts of dibutyltin dilaurate catalyst was added and mixed one minute before the mixture was charged to a mold. The charged mold was held at 300°F. for 60 minutes to react and cure the polyurethane. Test specimens were prepared in like manner and subjected to test. The results of these tests are shown in Table 1. It should be noted that the black loaded polyurethanes having a diene backbone failed (F) the Goodrich flex test where the Rv was 1.10 and less and 1.40. This data of Table 1 shows black loaded polyurethanes having a diene backbone produced at Rv of 1.25 ± 1.0 passed (P) the Goodrich flex test and have crescent tears in excess of 200 pounds per inch. Thus, these polyurethanes have properties suitable for more severe industrial usages such as solid industrial tires.

EXAMPLE II

A series of black loaded polyurethanes having a diene backbone was made using the procedure of Example I and the glycols shown in Table 2. These polyurethanes had the physical values shown in Table 2.

Table 1

| | PHYSICAL TESTS ON POLYURETHANE MADE AT Rv SHOWN | | | | | | |
|---|---|---|---|---|---|---|---|
| | | | | | | Goodrich Flex | |
| Rv Used | Tensile psi | Elongation % | Modulus 100% psi | C. Tear | Pass/ Fail | °F./ Min. | Hardness Shore A |
| 1.00 | 1800 | 410 | 580 | 210 | F | 188/4.5 | 70 |
| 1.10 | 2000 | 320 | 770 | 220 | F | 171/10 | 74 |

Table 1—Continued

PHYSICAL TESTS ON POLYURETHANE MADE AT Rv SHOWN

| Rv Used | Tensile psi | Elongation % | Modulus 100% psi | C. Tear | Goodrich Flex Pass/Fail | Goodrich Flex °F./Min. | Hardness Shore A |
|---|---|---|---|---|---|---|---|
| 1.20 | 2400 | 280 | 1000 | 200 | P | 86/15 | 80 |
| 1.30 | 2700 | 290 | 970 | 220 | P | 6?/15 | 86 |
| 1.40 | 1500 | 590 | 400 | 230 | F | 178/3 | 80 |

Table 2

PHYSICAL TESTS ON POLYURETHANES MADE AT Rv AND GLYCOL SHOWN

| Glycol Used | Rv Used | Tensile psi | Elong. % | Modulus 100% psi | C. Tear | Goodrich Flex Pass/Fail | Goodrich Flex °F./Min. | Hardness Shore A |
|---|---|---|---|---|---|---|---|---|
| Ethylene | 1.0 | 2600 | 340 | 810 | 280 | F | 215/4.7 | 68 |
|  | 1.2 | 3100 | 280 | 1130 | 250 | P | 142/15 | 82 |
| Propylene | 1.0 | 1700 | 530 | 670 | 240 | F | 123/2.3 | 77 |
|  | 1.2 | 3200 | 250 | 1390 | 220 | P | 67/15 | 84 |
| Triethylene | 1.0 | 1900 | 590 | 260 | 160 | F | 54/1 | 59 |
|  | 1.2 | 2200 | 280 | 770 | 200 | P | 69/15 | 80 |
| 2-Ethyl-1,3-Hexane Diol | 1.0 | 1900 | 430 | 510 | 220 | F | 104/9 | 74 |
|  | 1.2 | 2800 | 300 | 1350 | 250 | P | 86/15 | 89 |

In Table 1 and 2, C. Tear is crescent tear with test values expressed as pounds per inch, and the Goodrich Flex test in run according to ASTM Test Method D-623. F and p indicate respectively failed and passed, with actual temperature rise being reported as degrees Farenheit per minutes indicated.

Any of the carbon blacks can be used in this invention at the rate of 15 to 60 parts per 100 of hydroxyl terminated polymer, with the preferred range being 25 to 40 parts. The preferred carbon black is high abrasion furnace black.

Also, the toluene diisocyanate of Examples 1 and 2 may be replaced by monomeric or polymeric MDI and methane bis(cyclohexyl) isocyanate to obtain the polyurethane of this invention. Instead of the hydroxyl terminated polybutadiene styrene polymers of the above examples, hydroxyl terminated polybutadiene acrylonitrile polymer is preferred where unusual oil resistance is desired.

The catalysts useful in this invention are the well known polyurethane catalysts of the class of organic tin compounds with the tin being in either the stannous or stannic oxidation state and the organic radicals being alkyl, aryl, arylalkyl and carboxylic acid having from 1 to 20 carbon atoms. Also, the well known amine catalyst of the urethane type such as triethylene diamine can be used to advantage to control the cure rate. Normally the tin catalysts and amine catalysts are used in small amounts from .0001 to 0.01 phr and 0.1 to 1 phr respectively, ore more.

While certain representative embodiment and details have been shown for the purpose of illustrating the invention, it will be apparent to those skilled in this art that various changes and modifications may be made therein without departing from the spirit or scope of the invention.

What is claimed is:

1. A method of making a carbon black loaded polyurethane having a diene backbone consisting essentially of mixing 15 to 60 parts of carbon black with 100 parts of a hydroxyl terminated diene polymer having a hydroxyl equivalent value of 800 to 2200 and a glycol, said glycol and hydroxyl polymer being present in a ratio range varying from 2.5 to 1.0, then mixing in catalyst and organic polyisocyanate at the ratio of 1.25 ± 0.1 of isocyanate to total hydroxyl, molding and curing.

2. The method of claim 1 wherein the cured carbon black loaded polyurethane having a diene backbone has a crescent tear of at least 200 pounds per inch and passes the Goodrich Flex test.

3. The method of claim 1 wherein the organic polyisocyanate is toluene diisocyanate.

4. The method of claim 1 wherein the organic polyisocyanate is essentially a monomeric or polymeric methane di(phenyl isocyanate).

5. The method of claim 1 wherein the hydroxyl terminated polymer contains diene units selected from the class of butadiene, isoprene and 1,3-pentadiene.

6. The method of claim 1 wherein the catalyst is an organotin compound.

* * * * *